United States Patent [19]

Mishima et al.

[11] Patent Number: 5,219,902

[45] Date of Patent: Jun. 15, 1993

[54] METHOD OF BONDING A HYDROGENATED NITRILE RUBBER COMPOSITION WITH FIBERS AND ARTICLES

[75] Inventors: Kyoichi Mishima; Masayoshi Nakajima, both of Kobe; Takashi Hamada, Kakogowa, all of Japan

[73] Assignee: Mitsuboshi Belting Ltd, Japan

[21] Appl. No.: 643,428

[22] Filed: Jan. 22, 1991

[30] Foreign Application Priority Data

Jan. 25, 1990 [JP] Japan ................... 2-15180

[51] Int. Cl.$^5$ ............. C08K 9/04; D02G 3/02; B32B 25/16; B32B 25/02
[52] U.S. Cl. ..................... 523/206; 523/205; 523/207; 523/208; 428/378; 428/380; 428/383; 428/390; 428/393; 428/394; 428/395; 428/520; 428/522; 428/252; 428/287; 428/295
[58] Field of Search ............... 523/205, 206, 207, 208; 428/378, 380, 383, 390, 393, 394, 395

[56] References Cited

U.S. PATENT DOCUMENTS 4,762,745 8/1988 Mashimo et al. ............... 428/252
4,978,409 12/1990 Fujiwara et al. ................ 428/378

FOREIGN PATENT DOCUMENTS 18426 3/1990 Japan .
18427 3/1990 Japan .

*Primary Examiner*—Paul R. Michl
*Assistant Examiner*—Peter Szekely
*Attorney, Agent, or Firm*—Wood, Phillips, VanSanten, Hoffman & Ertel

[57] ABSTRACT

The present invention is directed to a method wherein fibers are treated with a first, second, and third treatment solution. The third treatment solution includes a chlorinated rubber and a rubber-containing composition having acrylonitrile-butadiene rubber or hydrogenated acrylonitrile-butadiene rubber. The treated fibers are positioned contiguous, and adhered, to an unvulcanized hydrogenated acrylonitrile-butadiene rubber composition which is then vulcanized. The resulting rubber-fiber composite exhibits improved adhesion between the hydrogenated acrylonitrile-butadiene rubber composition and the fibers. Adhesion is maintained in a hot environment even if subjected to what would conventionally be considered conditions that would result in thermal deterioration under high temperature. Thus, the rubber-fiber composite exhibits enhanced durability under the severe service conditions experienced by rubber-fiber composites.

17 Claims, 1 Drawing Sheet

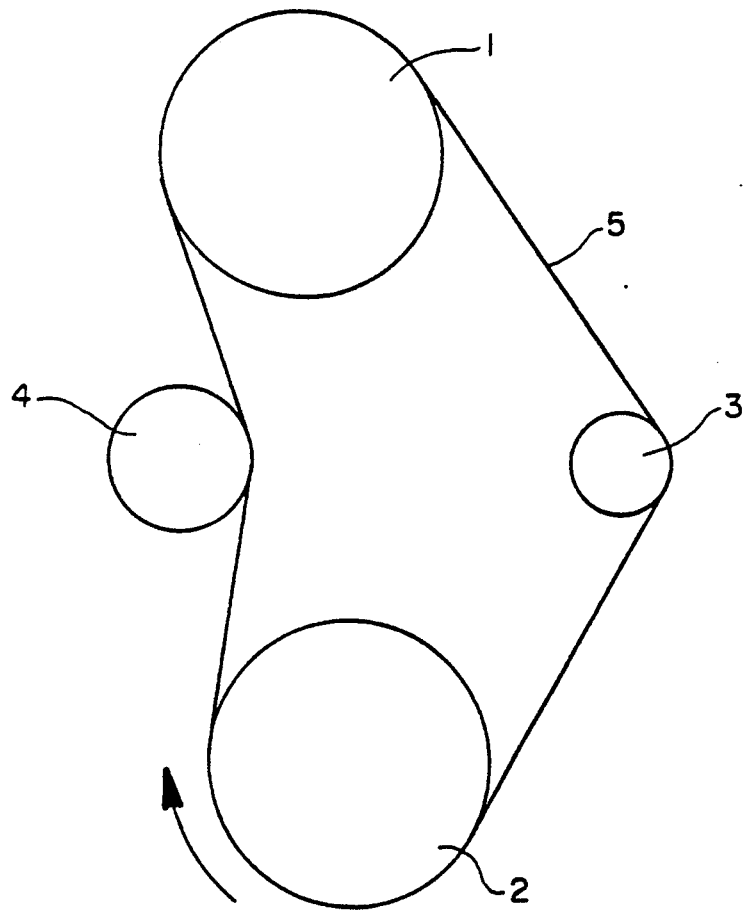

METHOD OF BONDING A HYDROGENATED NITRILE RUBBER COMPOSITION WITH FIBERS AND ARTICLES

FIELD OF THE INVENTION

The present invention relates to a method of bonding a hydrogenated nitrile rubber composition with fibers to produce a rubber-fiber composite. In particular, the present invention is to an advantageous method of bonding a rubber composition comprising hydrogenated-acrylonitrile-butadiene rubber copolymer having a percentage of butadiene saturation of about 80 mole % or more and fibers and to the rubber-fiber composites made by the method.

BACKGROUND OF THE INVENTION

In the manufacture of a rubber-fiber composite, there are known methods of bonding a sulfur-containing rubber composition with fibers. These methods include the steps of subjecting the fibers to surface treatment with a resorcin-formalin-rubber latex (RFL), soaking them in a cement solution of the foregoing rubber composition dissolved in an organic solvent, such as toluol (i.e., toluene), methyl ethyl ketone, or n-hexane, and adhering the treated fibers to the rubber composition.

These methods are effective to some extent in enhancing adhesion at ambient temperature (i.e., about 20° C. to 35° C.). However, these methods cannot provide an adhesive strength sufficient to withstand prolonged use in the hot environment (e.g., about 120° C. to about 150° C.) in which rubber-fiber composites are frequently used. These rubber-fiber composites that cannot withstand prolonged use in hot environments are liable to have problems resulting from interlayer peeling.

In making multi-rib belts, raw edge belts, and flat belts, which are used in hot environments such as those that occur around automobile engines, general purpose rubbers, such as chloroprene rubber (CR), have been generally used. However, heat resistant rubbers, such as epichlorohydrin rubber (CHR), chlorosulfonated polyethylene rubber (CSM), and ethylene propylene diene rubber (EPDR), are now used in an attempt to improve durability at engine temperatures which have increased because of exhaust emission controls and increased automobile speeds. But these heat resistant rubbers have a short service life and other unacceptable properties. For example, CHR has poor thermosoftening and low temperature resistance, CSM has the disadvantages of large internal heat generations, and poor cold and oil resistance, and EPDM has insufficient oil resistance.

Under the circumstances, hydrogenated acrylonitrile-butadiene rubber (H-NBR) compositions are attracting much attention because of its excellent oil and heat resistance.

However, incorporation of sulfur into H-NBR, the usual manner for bonding rubber with fibers, has an adverse effect on the heat resistance of the H-NBR. Therefore, in order to retain the desired concurrent heat and oil resistance of the H-NBR, enhanced adhesion between the H-NBR and fibers with a reduced amount of sulfur is necessary.

In Japanese Patent Examination Publication No. 24131/1985, a method of bonding an unvulcanized H-NBR composition with fibers is disclosed which comprised the steps of treating fibers with a rubber latex solution of a hydrogenated acrylonitrile-butadiene latex having a carboxyl group content of 3%, and a mixture of resorcin and formalin prepared so as to give a rubber latex to resorcin-formalin mixture ratio of 10:1 to 2:1 by solid weight and a resorcin to formalin molar ratio of 1:3 to 3:1, and then vulcanizing the H-NBR composition while sticking it to the treated fibers.

While the bonding method proposed in the above-identified Japanese Publication was effective in improving adhesive strength at normal temperatures, it could not provide an adhesive strength sufficient to withstand the above-mentioned high-temperature, hot environment. Moreover, the method had limitations in industrial application since it needed to specify hydrogenated acrylonitrile-butadiene latex as the rubber latex to be used.

The present invention solves at least some of the above problems by providing a new bonding method. The rubber-fiber composite produced by the method can be used to improve the durability of rubber products, including belts, used in a hot environment. The method bonds a rubber composition including mainly hydrogenated acrylonitrile-butadiene rubber (a H-NBR composition) with a percentage of butadiene saturation of about 80 mole % or more with fibers with sufficient adhesion to inhibit interlayer peeling even if the rubber-fiber composite is subjected to thermal deterioration.

SUMMARY OF THE INVENTION

The present invention is directed to a method of bonding a hydrogenated acrylonitrile-butadiene rubber (H-NBR) composition with fibers to produce a rubber-fiber composite. The method includes the steps of providing fibers; treating the fibers with a first treatment solution containing a polyepoxide-containing composition or a polyisocyanate compound, a second treatment solution of a resorcin-formalin-rubber latex composition, a third treatment solution of an organic solvent solution of chlorinated rubber and a rubber-containing composition including acrylonitrile-butadiene rubber (NBR) or H-NBR having a percentage of butadiene saturation of about 80 mole % or more; providing an unvulcanized H-NBR composition having a percentage of butadiene saturation of about 80 mole % or more, the unvulcanized H-NBR composition having a surface; positioning the treated fibers contiguous to the surface; and vulcanizing the previously unvulcanized H-NBR composition. The present invention is also directed to a rubber-fabric composite produced utilizing this method.

The present method results in an improved adhesion between the H-NBR composition and the fibers such that belts produced from the rubber-fabric composites are able to withstand use in hot environments, e.g., about 120° C. to about 150° C., for prolonged for a time period without interlayer peeling or pop-out of the fibers. Furthermore, these results can be achieved utilizing a variety of rubber latexes in the second treatment solution.

BRIEF DESCRIPTION OF THE DRAWING

The FIGURE is a schematic diagram to the tester used in the belt running test.

DETAILED DESCRIPTION OF THE PREFERRED EMBODIMENTS

. The present invention is directed to a method of bonding a hydrogenated nitrile rubber, i.e., a hydrogenated acrylonitrile-butadiene rubber (H-NBR) composition having a percentage of butadiene saturation of about 80 mole % or more, with fibers to produce a rubber-fiber composite. In the method, the fibers are treated with a first treatment solution containing at least one polyepoxide-containing composition or at least one polyisocyanate compound, then with a second treatment solution of a resorcin-formalin-rubber latex, and then with a third treatment solution of an organic solvent solution of chlorinated rubber and a rubber-containing composition that includes acrylonitrile-butadiene rubber (NBR) or H-NBR to produce a coating on the treated fibers. The treated fibers are then stuck to the unvulcanized H-NBR composition which is then conventionally vulcanized. The treated fibers are incorporated into the H-NBR composition. The incorporation can be partial with the fibers being partially within the H-NBR composition or complete with the fibers being entirely within the H-NBR composition.

The fibers used in the invention are those normally used in bonding with rubber to make rubber-fiber composites. Examples of these fibers include synthetic fibers, such as 6-nylon, 6,6-nylon, vinylon, polyester and aramid, regenerated cellulose fibers such as rayon, and natural fibers such as cotton. Of these fibers, polyester and aramid fibers are most suitable for applications which need high-temperature durability.

The fibers are treated with the first treatment solution of a polyepoxide-containing composition or a polyisocyanate compound, the second treatment solution of a resorcin-formalin-rubber latex mixture, and the third treatment solution of an organic solvent solution of chlorinated rubber and a rubber-containing composition of which the primary component is NBR or H-NBR.

Details of the treatments are as follows. Soaking of the fibers in each of the treatment solutions was performed at a fiber tension of about 0.1 to about 1.0 g/d and for a time period of about 1 to about 20 seconds (sec.) prior to the prescribed drying step. After soaking in the first treatment solution, the fibers are dried at about 150° C. to about 220° C., preferably about 160° C. to about 210° C., for about 1 to about 5 minutes. Drying conditions after soaking in the second treatment solution vary, depending upon the kinds of fibers, but include a temperature and time sufficient to permit the second treatment solution on the fibers to react and fix adequately. Drying is usually done at about 140° C. to about 240° C. for about 1 to about 5 minutes. Normal drying conditions for aramid fibers are about 170° C. to about 200° C. for about 2 minutes, but not limited to that. And drying after soaking in the third treatment solution is done at about 100° C. to about 200° C. for about 1 to about 4 minutes.

Examples of the polyepoxide-containing composition suitable for use in the first treatment solution include a reaction product between a polyhydric alcohol, such as ethylene glycol, glycerine, sorbitol or pentaerythritol and a halogen-containing epoxy component; a reaction product between a polyalkylene glycol, such as polyethylene glycol, and a halogen-containing epoxy compound, such as epichlorohydrin; and a reaction product between a polyphenol, such as resorcin, bis-(4-hydroxyphenyl)dimethyl ethane, phenolformaldehyde resin, or resorcin-formaldehyde resin and a halogen-containing epoxy compound.

Examples of the polyisocyanate compound suitable for use in the first treatment solution include a diisocyanate, such as 4,4'-diphenylmethane diisocyanate, toluene 2,4-diisocyanate, 4,4'-dicyclohexylmethane diisocyanate, or p-phenyldiisocyanate; a triisocyanate such as triphenylmethane triisocyanate; a polyisocyanate represented by the following chemical formula

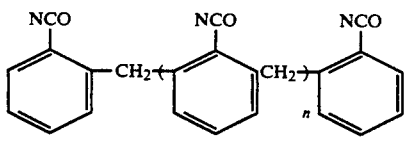

wherein n represents an integer of 1 to about 3 (for example, a polymethylene polyphenylisocyanate commercially available under the trade name PAPI); and the like. A blocked isocyanate, such as an addition product between any of the foregoing isocyanates and an active hydrogen compound, such as phenol, cresol, octyl phenol, ε-caprolactam, or sodium hydrogen sulfite, can also be used.

The polyepoxide-containing composition and the polyisocyanate compound can be dissolved in a suitable solvent, such as toluene, to produce the first treatment solution having the desired treatment and coating characteristics. Preferably, the solids content of the first treatment solution is about 5 to about 20% by weight.

The resorcin-formalin-rubber latex used in the second treatment solution is a mixture of an initial condensation product of resorcin with formalin and a rubber latex. The molar ratio of resorcin to formalin is preferably about 3:1 to about 1:3 for a higher adhesive strength. In preparing the mixture, about 5 to about 100 parts by dry weight of an initial condensation product between resorcin and formalin is incorporated into about 100 parts by dry weight of a rubber latex. Then, the mixture is adjusted to a solids concentration of about 5 to about 40% by weight using a suitable solvent such as water. The second treatment solution is then aged at about room temperature for about one week. The second treatment solution changes to a pink color when the initial condensation product is present. After aging, the color changes to violet. The second treatment solution is utilized when its color is pink to violet.

The rubber latex of the second treatment solution can be varied without adversely effecting the adhesion of the fibers to the H-NBR composition.

Examples of the rubber latex utilized in the second treatment solution include chloroprene latex, acrylonitrile-butadiene copolymer rubber latex, hydrogenated acrylonitrile-butadiene copolymer rubber latex having a percentage of butadiene saturation of about 80 mole % or more, styrene-butadiene-vinylpyridine copolymer rubber latex and the like. These latexes can be used singly or in combination.

The third treatment solution includes the organic solvent solution of chlorinated rubber and a rubber-containing composition having NBR or H-NBR as the principal component. The chlorinated rubber has a chlorine content of about 60% or more, i.e., 60% or more of the double bonds of the rubber are saturated with chlorine.

Representative of the suitable chlorinated rubbers are chlorinated natural rubbers having the chemical formula $(C_5H_7Cl_3)_x(C_5H_6Cl_4)_y(C_{10}C_{CH})_z$ wherein X, Y and Z are preferably selected so that the chlorinated rubber has a number average molecular weight of about 5,000 to about 10,000.

The rubber-containing composition having NBR or H-NBR as the principal component is a composition that includes a conventional rubber vulcanizing agent, vulcanization accelerator, and reinforcing agent or filler, such as carbon black.

The third treatment solution is a cement prepared by dissolving about 20 to about 90 parts by weight of the chlorinated rubber and about 80 to about 10 parts by weight of a rubber-containing composition of NBR or H-NBR in an organic solvent, such as toluene or methyl ethyl ketone, so as to give a solids concentration of about 5 to about 20 wt%.

The principal component of the H-NBR composition used in the invention is hydrogenated acrylonitrile-butadiene rubber with a percentage of butadiene saturation of about 80 mole % or more. Preferably, the percentage of butadiene saturation is about 90 mole % or more. The percentage of butadiene saturation indicates the amount of the double bonds of the butadiene that are saturated with hydrogen. To said rubber, a reinforcing material, plasticizer, antioxidant, and vulcanizing agent are added as required for specific applications to produce the H-NBR composition.

After placing the treated fibers so they are contiguous with an unvulcanized H-NBR composition, vulcanization can be carried out in a conventional manner.

When the method does not utilize the third treatment solution, the initial adhesive strength between the H-NBR composition and fibers treated with the first and second treatment solutions is good, but it greatly decreases with age. Moreover, if the coating film on the treated fibers is formed without the third treatment solution, the coating film on the fibers lacks flexibility. Fibers not treated with the third treatment solution that were used as belt cords for a belt core, for example, deteriorated at their adhesive layers in a short time due to thermal fatigue and repeated bending, and pop out of the sides of the belt.

The following Examples of the present invention are provided by way of representation and not limitation. Amounts in the Examples are shown in parts by weight (PBWt) unless otherwise specified.

EXAMPLE 1

The first treatment solution was prepared by dissolving 10 grams (g) of PAPI (a polyisocyanate compound made by Kasei Upjohn) in 90 g of toluene.

The second treatment solution was prepared in steps by dispersing 3 g of resorcin and 2 g of formalin (37%) in 130 g of water with adequate stirring, separately diluting 400 g of Nippol 2518-FS (a water-borne styrene-butadiene-vinylpyridine copolymer rubber latex having a solids content of 40% made by Nippon Zeon, hereinafter referred to as VP) with 400 g of water, adding the above resorcin-formalin dispersion to the diluted latex while stirring slowly to mix them uniformly, and aging the mixture at room temperature for one week or more.

Rubber-containing composition A of the third treatment solution was prepared using the formulation shown in Table 1. In the first half of the preparation (until a cross-linking agent was added, i.e., prior to introduction of the MBTS, sulfur and hexamethoxy methylolmelamine of the second half of the preparation), stirring was carried out with a BR-type Banbury mixer. In the second half of the preparation, a cross-linking agent was added using a laboratory roller mill.

TABLE 1

| Rubber-containing composition A | |
|---|---|
| Component | Parts by Weight (PBWt) |
| NBR | 100 |
| Zinc oxide | 5 |
| Stearic acid | 1 |
| Carbon black (HAF)[1] | 15 |
| Hydrate silicic acid | 30 |
| Resorcin-formalin polymer | 2 |
| Accelerator (MBTS)[2] | 1.5 |
| Sulfur | 2 |
| Hexamethoxy methylolmelamine | 4 |

[1]High abrasion furnace black
[2]2-Mercaptobenzothiazyl disulfide

Then, the third treatment solution was prepared having the formulation shown in Table 2 by admixing the components. Two comparative third treatment solutions (comparisons 1 and 2) were also prepared having the formulations shown in Table 2.

TABLE 2

| | The third treatment solution (wt %) | | |
|---|---|---|---|
| Component | Example 1 | Comparison 1 | Comparison 2 |
| Rubber-containing composition A | 5 | 10 | — |
| Chlorinated rubber* | 5 | — | 10 |
| Toluene | 90 | 90 | 90 |
| | Formulation −2 | Formulation −3 | Formulation −4 |

*Chlorinated rubber CR-20 made by Asahi Denka Kogyo (chlorine content: 65%)

Fibers were treated with the three treatment solutions prepared as above and then subjected to an adhesion test (with the adhesion being to a H-NBR composition) and a belt running test as described below.

(A) Treatment of fiber (cord)

Fibers (cords) consisting of polyester yarn (1000 d/1×5, final twist: 15 times/10 cm, primary twist: 30 times/10 cm) were soaked at a tension of about 0.4 g/d for a time period of about 1 sec in the foregoing first treatment solution in cord treating equipment and dried at 200° C. for 2 minutes; next, the cords were soaked at a tension of about 0.4 g/d for a time period of about 1 sec in the second treatment solution and then subjected to heat treatment at 230° C. for 2 minutes; subsequently, the cords were soaked at a tension of about 0.4 g/d for a time period of about 1 sec in one of the three third treatment solutions (formulation 2 was of the invention, formulation 3 and formulation 4 were for comparison) and then dried at 150° C. for 2 minutes.

(B) Adhesion Test

Adhesion to the cushion H-NBR composition (the formulation of which is shown in Table 3) by the treated cords was evaluated by measuring the peeling strength between the cords and rubber, and for percentage of adhering rubber. For this adhesion test, sheet samples with a width of 25 mm, a length of 140 mm, and a thickness of 3 mm were first prepared by arranging the treated cords densely side by side on the H-NBR composition, and then heating the arrangement for 30 minutes at 150° C. under a pressure of 50 kg/cm². Next, the samples were allowed to stand at 140° C. for a prescribed time period of 1, 3, 5 or 7 days. A T-peeling test (ASTM D-1876-72) was then carried out on each sample at the end of the prescribed time period to measure peeling strength. At the same time, the percentage of adhering rubber was determined by observing exposed area of cords after the test.

(C) Belt Running Test

Multi-rib belts were prepared by a conventional method from the treated cords and H-NBR compositions (the formulations of which are shown in Tables 3 and 4). The cushion H-NBR composition of Table 3 contains the cords therein and forms the body of the belt. The compression H-NBR composition of Table 4 forms the teeth of the belt. The method of producing the multi-rib belts was conventional although the treated cords of the present invention used in the multi-rib belts are not conventional. The belts were subjected to a belt running test to evaluate the pop-out resistance of the cords and determine belt life. Pop-out resistance is the resistance of the cords to pop-out from the sides of a belt, or friction faces with pulleys, due to an adhesive layer break caused by bending and thermal fatigue.

The belt running test was carried out at 120° C. using a tester as shown in the FIGURE, wherein a multi-rib belt (5) was run circularly, in the direction indicated by the arrow, between a drive pulley (1) having a diameter of 120 millimeters (mm) and rotating at 4900 revolutions per minute (rpm), and a driven pulley (2) having a diameter of 120 mm and 12 horsepower per meter (PS) kept in contact with a tension pulley (3) having a diameter of 45 mm and a load of 57 kilograms (kg) and an idle pulley (4) having a diameter of 85 mm. The time elapsed before cracking at the bottom of the belt or cords popping-out was measured.

For comparison, two types of comparison treated cords (comparisons 3 and 4) were prepared in the same manner as above except that the third treatment solutions prepared by formulation 3 and formulation 4 in Table 2 were used. These cords were also subjected to the above adhesion test and belt running test.

The test results are shown in Table 5.

TABLE 3

| Cushion H-NBR Composition | |
|---|---|
| Material | Parts (PBWt) |
| H-NBR (percentage of butadiene saturation: 90 mole %) | 100 |
| Zinc oxide | 5 |
| Stearic acid | 1 |
| Carbon black (HAF)[1] | 25 |
| Hydrated silicic acid | 20 |
| Resorcin-formalin polymer | 2 |
| Antioxidant | 2 |
| Accelerator (M)[2] | 1 |
| Accelerator (TMTD)[3] | 1 |
| Hexamethoxy methylolmelamine | 2 |
| Sulfur | 1 |

[1]High abrasion furnace black
[2]2-Mercaptobezothiazole
[3]Tetramethylthiuram disulfide

TABLE 4

| Compression H-NBR Composition | |
|---|---|
| Material | Parts (PBWt) |
| H-NBR (percentage of butadiene saturation: 90 mole %) | 100 |
| 6,6-nylon cut yarn (6 mm) | 15 |
| Zinc oxide | 5 |
| Stearic acid | 1 |
| Carbon black | 30 |
| Antioxidant | 2 |
| Plasticizer | 5 |
| Accelerator (M)[1] | 1 |
| Accelerator (TMTD)[2] | 2 |
| Sulfur | 0.5 |

[1]2-Mercaptobezothiazole
[2]Tetramethylthiuram disulfide

TABLE 5

Test Results

| | Latex used in the second treatment solution | The third treatment solution | Peeling strength [kg/in] (percentage of adhering rubber) [%] | | | | | Belt life and cause of termination |
|---|---|---|---|---|---|---|---|---|
| | | | Original | 140° C. × | | | | |
| | | | | 1 day | 3 days | 5 days | 7 days | |
| Example 1 | VP | Containing chlorinated rubber | 40 (80) | 40 (80) | 38 (80) | 35 (85) | 30 (90) | 220 Hrs Cracks in rib rubber |
| Comparison 3 | VP | No chlorinated rubber | 20 (50) | 15 (50) | 12 (40) | 10 (40) | 5 (30) | 24 Hrs Popping out |
| Comparison 4 | VP | No rubber containing composition | 40 (80) | 30 (70) | 22 (60) | 12 (50) | 10 (50) | 220 Hrs Popping out |

As apparent from the test results shown in Table 5, the sample of the invention which was treated with the third treatment solution, containing chlorinated rubber and a rubber-containing composition of NBR or H-NBR depending on the invention, registered less drop in adhesion even after being subjected to thermal deterioration at high temperature; moreover, it had excellent durability, causing no pop-out, and terminated its life span in other ways. On the contrary, the comparison 3 containing no chlorinated rubber was low in peeling strength and experienced pop-out in a short time.

The comparison 4, which used a third treatment solution consisting of chlorinated rubber, registered good initial adhesion, but the adhesion decreased greatly as time passed. Further, the adhesive layer covering the cords lacked flexibility; therefore the cords also popped out.

EXAMPLE 2

Cords were treated in the same manner as in EXAMPLE 1, except that VP was replace with an equal amount of Nippol LX-1571 (a water-borne carboxyl-modified acrylonitrile-butadiene copolymer rubber latex having a solids content of 40 wt%, a product of Nippon Zeon), in order to improve adhesion with the H-NBR composition by using a latex chemically similar to H-NBR. Then, the peeling strength, adhesion and belt running tests were performed in accordance with EXAMPLE 1 using the cords of EXAMPLE 2.

For comparison, a sample (comparison 5) was prepared using as the third treatment solution the formulation 3 of Table 2 that contained no chlorinated rubber.

The test results are shown in Table 6.

TABLE 6

Test Results

| | Latex used in the second treatment solution | The third treatment solution | Peeling strength [kg/in] and (percentage of adhering rubber) [%] | | | | | Belt life and cause of termination |
|---|---|---|---|---|---|---|---|---|
| | | | | | 140° C. × | | | |
| | | | Original | 1 day | 3 days | 5 days | 7 days | |
| Example 2 | NBR | Containing chlorinated rubber | 40 (80) | 40 (80) | 39 (80) | 38 (85) | 35 (90) | 230 Hrs Cracks in rib rubber |
| Comparison 5 | NBR | No chlorinated rubber | 25 (50) | 20 (50) | 15 (40) | 10 (40) | 5 (30) | 48 Hrs Popping out |

The test results of Table 6 indicates that use of chlorinated rubber in the third treatment solution enhances adhesion of fibers to a H-NBR composition without the substantial influence of the type of latex used in the second treatment solution.

EXAMPLE 3

A first treatment solution was prepared by adding 1 g of Neokol SW-30 (30% aqueous solution on sodium dioctylsulfosuccinate, a product of Daiichi Kogyo Seiyaku) as a surfactant to 20 g of pentaerythritol diglycidylether, and adding this mixture to 976 g of water while vigorously stirring. Then, 3 g of 10% aqueous solution of sodium hydroxide was added thereto.

Cords consisting of the same polyester yarn as in EXAMPLE 1 were soaked in the first treatment solution of this EXAMPLE at a tension of about 0.4 g/d for a time period of about 1 sec. After drying at 150° C. for 2 minutes, the cords were treated with the same second and third treatment solutions and conditions as were used in EXAMPLE 1 and then evaluated for peeling strength and adhesion to the H-NBR composition shown in Table 3. Cords treated with the third treatment solution having the formula of formulation 3 of Table 2 which contained no chlorinated rubber were used as comparison 6. The peeling strength and adhesion tests were performed in accordance with EXAMPLE 1 using the cords of EXAMPLE 3.

The test results are shown in Table 7.

TABLE 7

Test Results

| | Peeling strength [kg/in] (percentage of adhering rubber) [%] | | | | |
|---|---|---|---|---|---|
| | | | 140° C. × | | |
| | Original | 1 day | 3 days | 5 days | 7 days |
| Example 3 | 38 (80) | 38 (80) | 36 (80) | 33 (85) | 30 (90) |
| Comparison 6 | 18 (50) | 15 (50) | 12 (40) | 9 (40) | 5 (30) |

As seen in the above Table 7, use of a polyepoxy compound in the first treatment solution is also effective for improving the adhesion between the cords and rubber.

What is claimed is:

1. A method of bonding a hydrogenated nitrile rubber composition with fibers comprising the steps of: providing fibers;
treating the fibers with a first treatment solution containing a polyepoxide-containing composition or a polyisocyanate compound, then a second treatment solution of a resorcin-formalin-rubber latex composition, then a third treatment solution of an organic solvent solution of chlorinated rubber and a rubber-containing composition including acrylonitrile-butadiene rubber or hydrogenated acrylonitrile-butadiene rubber, the rubber latex of the second treatment solution comprising at least one of an acrylonitrile-butadiene rubber and a hydrogenated acrylonitrile-butadiene rubber;
providing an unvulcanized hydrogenated acrylonitrile-butadiene rubber composition having a percentage of butadiene saturation of about 80 mole % or more, the unvulcanized rubber having a surface;
positioning the treated fibers contiguous to the surface; and
vulcanizing the previously unvulcanized rubber.

2. The method in accordance with claim 1 wherein the unvulcanized rubber has a percentage of butadiene saturation of about 90 mole % or more.

3. The method in accordance with claim 1 wherein the organic solvent solution of chlorinated rubber of the third treatment solution has a chlorine content of about 60% or more.

4. The method in accordance with claim 1 wherein the third treatment solution is produced by dissolving about 20 to about 90 parts by weight of a chlorinated rubber having a chlorine content of about 60% or more and about 80 to about 10 parts by weight of the rubber-containing composition in an organic solvent, the third treatment solution having a solids concentration of about 5 to about 20 weight percent.

5. The method in accordance with claim 1 wherein the second treatment solution has a molar ratio of resorcin to formalin of about 3:1 to about 1:3.

6. The method in accordance with claim 5 wherein the second treatment solution has about 5 to about 100 parts by dry weight of the resorcin and formalin and about 100 parts by dry weight of the rubber latex.

7. A method of bonding a hydrogenated nitrile rubber composition with fibers comprising the steps of:
providing fibers; and
treating the fibers with a first treatment solution containing a polyepoxide-containing composition or a polyisocyanate compound, a second treatment solution of a resorcin-formalin-rubber latex composition, a third treatment solution of an organic solvent solution of chlorinated rubber and a rubber-containing composition including acrylonitrile-butadiene rubber or hydrogenated acrylonitrile-butadiene rubber.

8. The method in accordance with claim 7 further comprising the steps of:
providing an unvulcanized hydrogenated acrylonitrile-butadiene rubber composition having a percentage of butadiene saturation of about 80 mole % or more, the unvulcanized rubber having a surface; and
positioning the treated fibers contiguous to the surface.

9. A rubber-fiber composite comprising:
fibers treated with a first treatment solution containing a polyepoxide-containing composition or a polyisocyanate compound, a second treatment solution of a resorcin-formalin-rubber latex composition and a third treatment solution of an organic solvent solution of chloronated rubber and a rubber-containing composition including acrylonitrile-butadiene rubber or hydrogenated acrylonitrile-butadiene rubber, the rubber latex of the second treatment solution comprising at least one of an acrylonitrile-butadiene rubber and a hydrogenated acrylonitrile-butadiene rubber; and
a hydrogenated acrylonitrile-butadiene rubber composition having a percentage of butadiene saturation of about 80 mole % or more, wherein the treated fibers are incorporated into the rubber composition.

10. The rubber-fiber composite in accordance with claim 9 wherein the fibers are entirely within the rubber composition.

11. The rubber-fiber composite in accordance with claim 9 wherein the unvulcanized rubber has a percentage of butadiene saturation of about 90 mole % or more.

12. The rubber-fiber composite in accordance with claim 9 wherein the organic solvent solution of chlorinated rubber of the third treatment solution has a chlorine content of about 60% or more.

13. The rubber-fiber composite in accordance with claim 9 wherein the third treatment solution is produced by dissolving about 20 to about 90 parts by weight of a chlorinated rubber having a chlorine content of about 60% or more and about 80 to about 10 parts by weight of the rubber-containing composition in an organic solvent, the third treatment solution having a solids concentration of about 5 to about 20 weight percent.

14. The rubber-fiber composite in accordance with claim 9 wherein the second treatment solution has a molar ratio of resorcin to formalin of about 3:1 to about 1:3.

15. The rubber-fiber composite in accordance with claim 14 wherein the second treatment solution has about 5 to about 100 parts by dry weight of the resorcin and formalin and about 100 parts by dry weight of the rubber latex.

16. The method in accordance with claim 7 wherein the organic solvent solution of chlorinated rubber of the third treatment solution has a chlorine content of about 60% or more.

17. The method in accordance with claim 7 wherein the third treatment solution is produced by dissolving about 20 to about 90 parts by weight of a chlorinated rubber having a chlorine content of about 60% or more and about 80 to about 10 parts by weight of the rubber-containing composition in an organic solvent, the third treatment solution having a solids concentration of about 5 to about 20 weight percent.

* * * * *